Dec. 19, 1961     C. W. CHILL ET AL     3,013,506
SKIP TRANSFER MECHANISM FOR CONVEYING APPARATUS
Filed Aug. 7, 1959     8 Sheets-Sheet 1
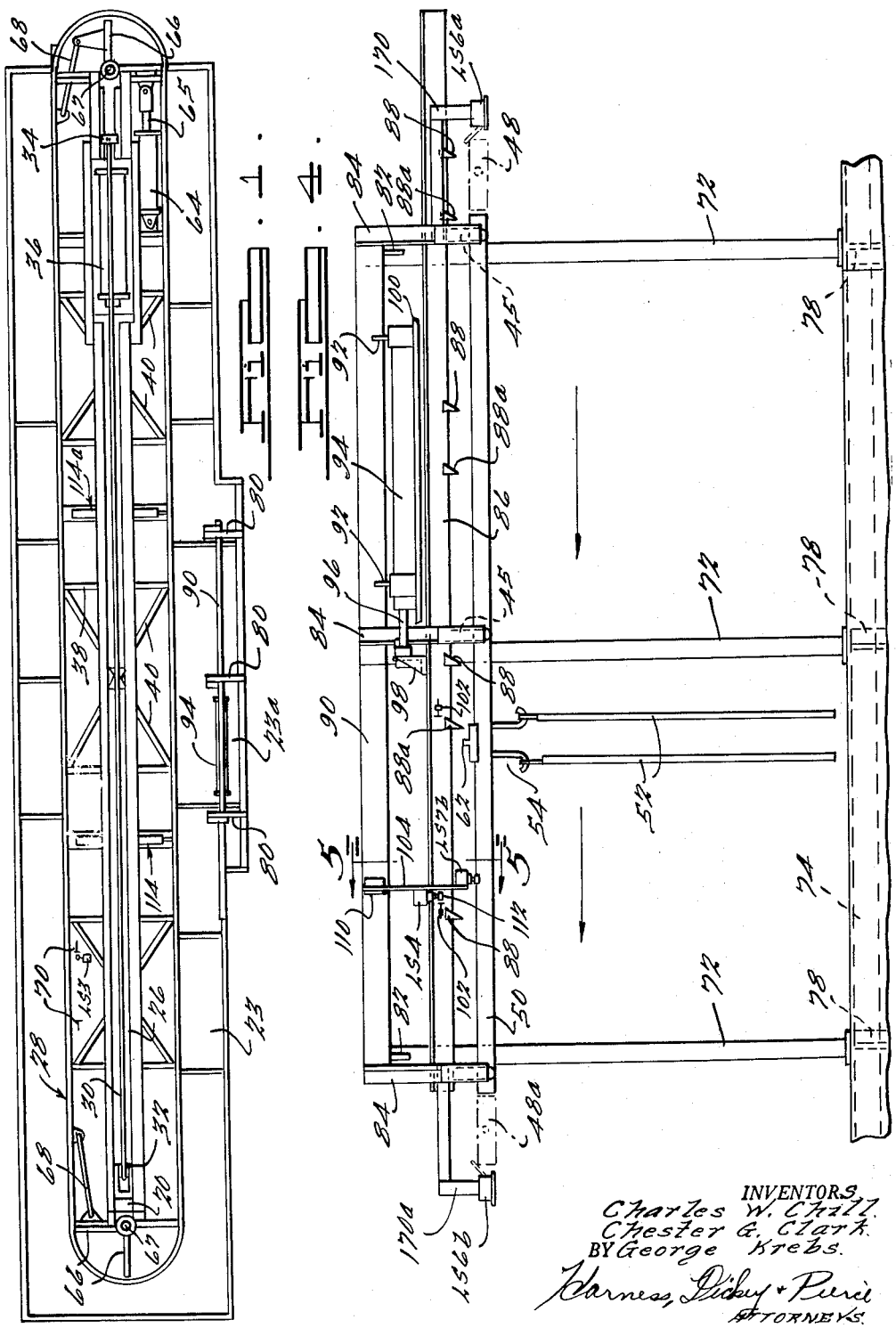
INVENTORS,
Charles W. Chill,
Chester G. Clark.
BY George Krebs.
Harness, Dickey & Pierce
ATTORNEYS

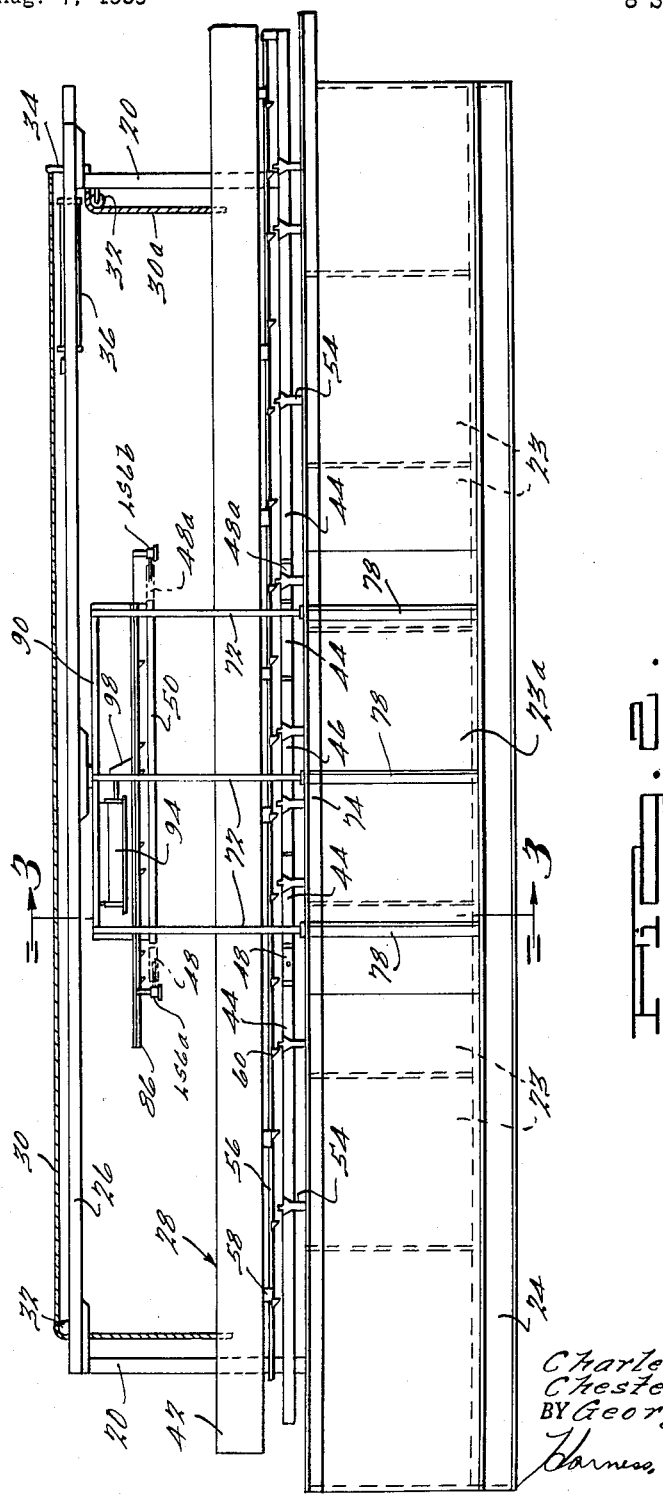

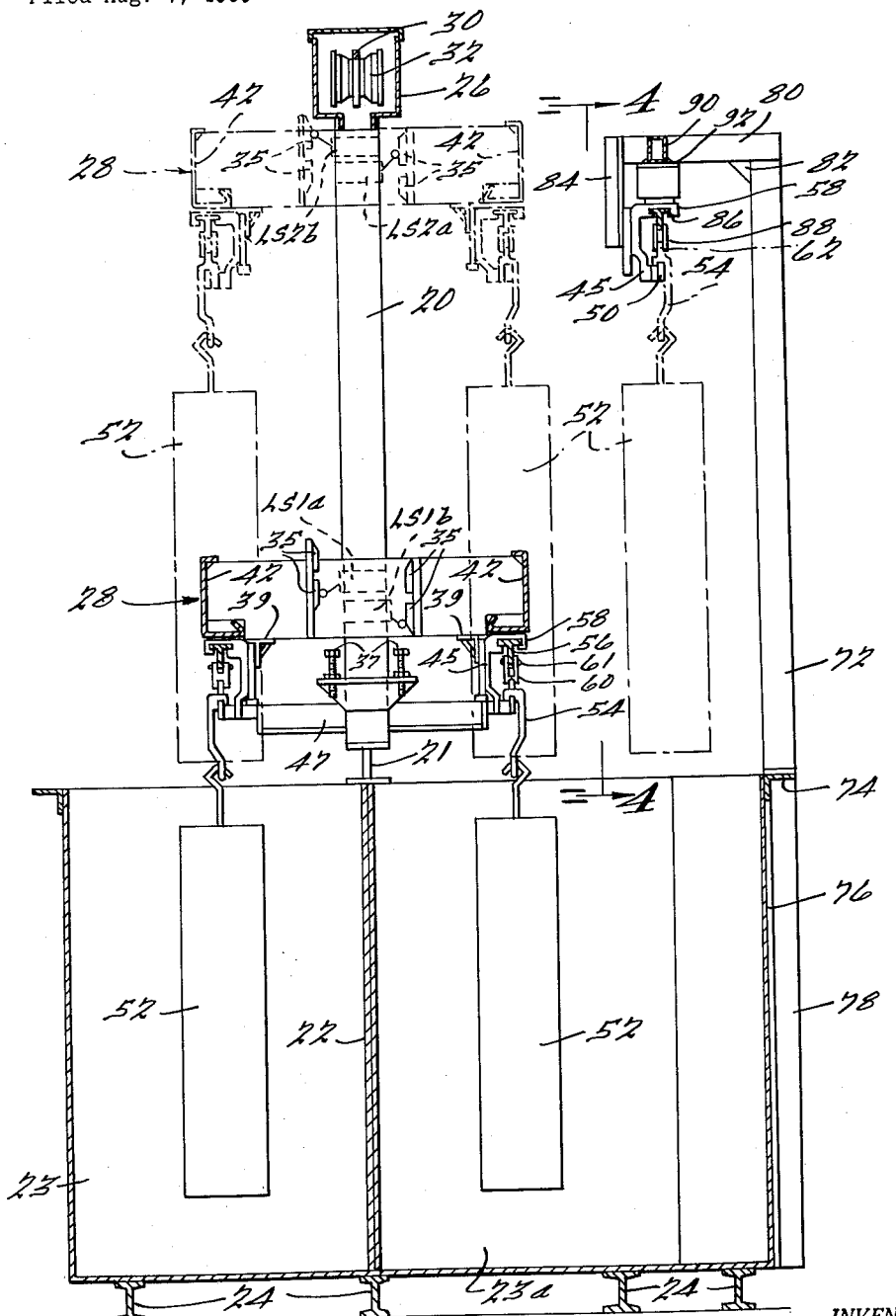

Dec. 19, 1961 C. W. CHILL ET AL 3,013,506
SKIP TRANSFER MECHANISM FOR CONVEYING APPARATUS
Filed Aug. 7, 1959 8 Sheets-Sheet 4
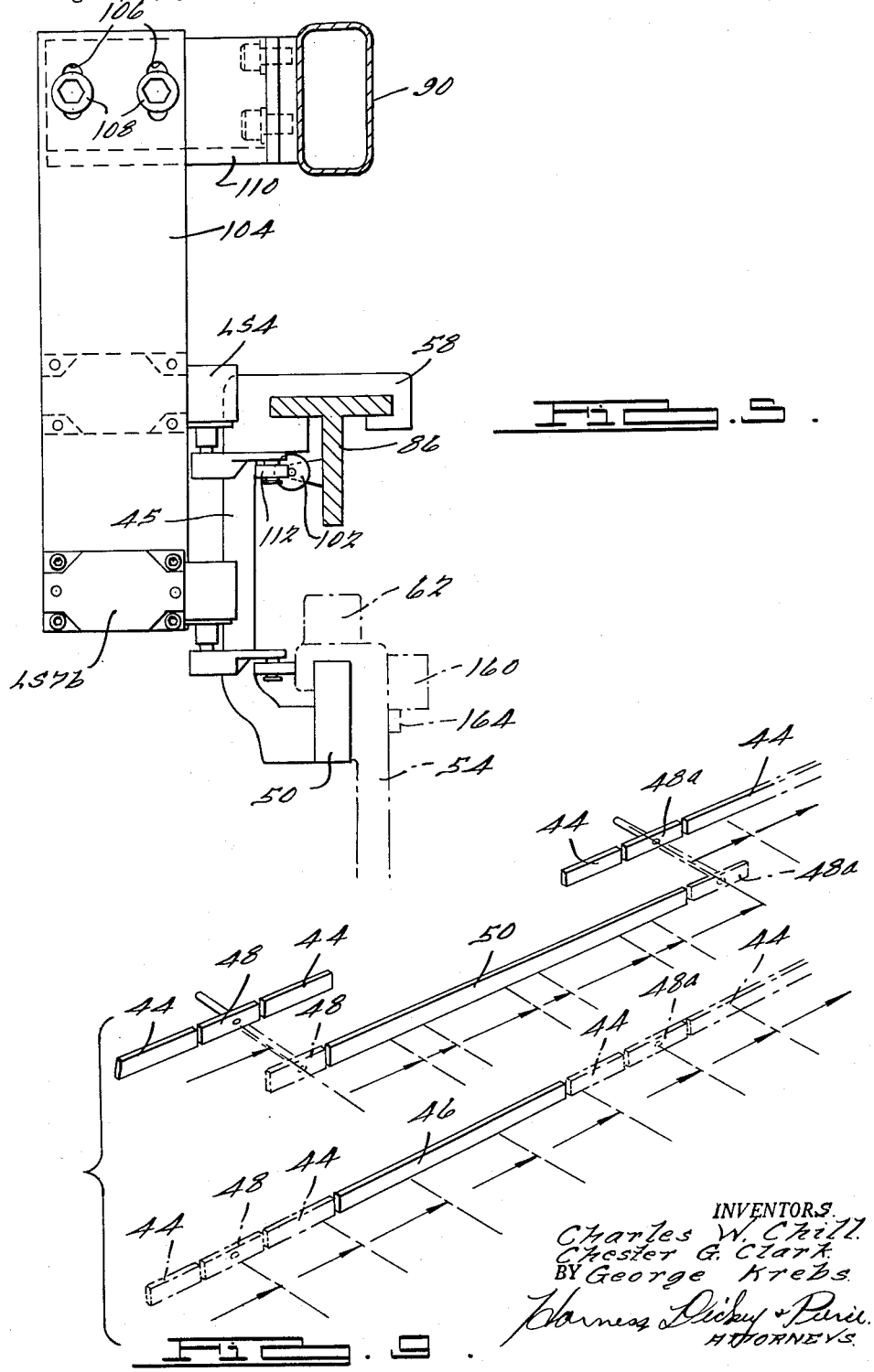
INVENTORS.
Charles W. Chill.
Chester G. Clark.
BY George Krebs
Harness Dickey & Pierce.
ATTORNEYS.

Dec. 19, 1961   C. W. CHILL ET AL   3,013,506
SKIP TRANSFER MECHANISM FOR CONVEYING APPARATUS
Filed Aug. 7, 1959   8 Sheets-Sheet 5
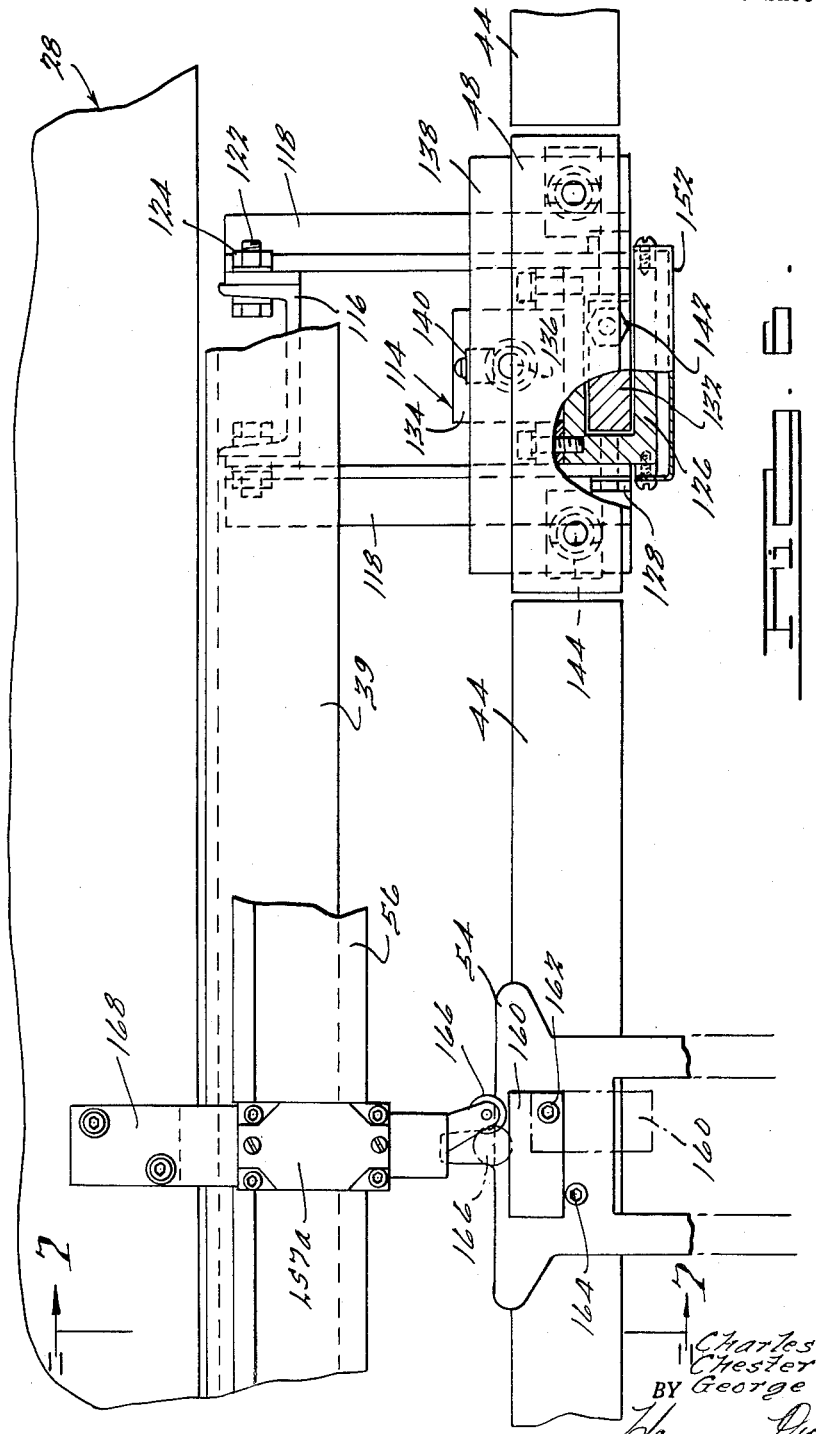
INVENTORS
Charles W. Chill
Chester G. Clark
BY George Krebs
Harness, Dickey & Pierce
ATTORNEYS

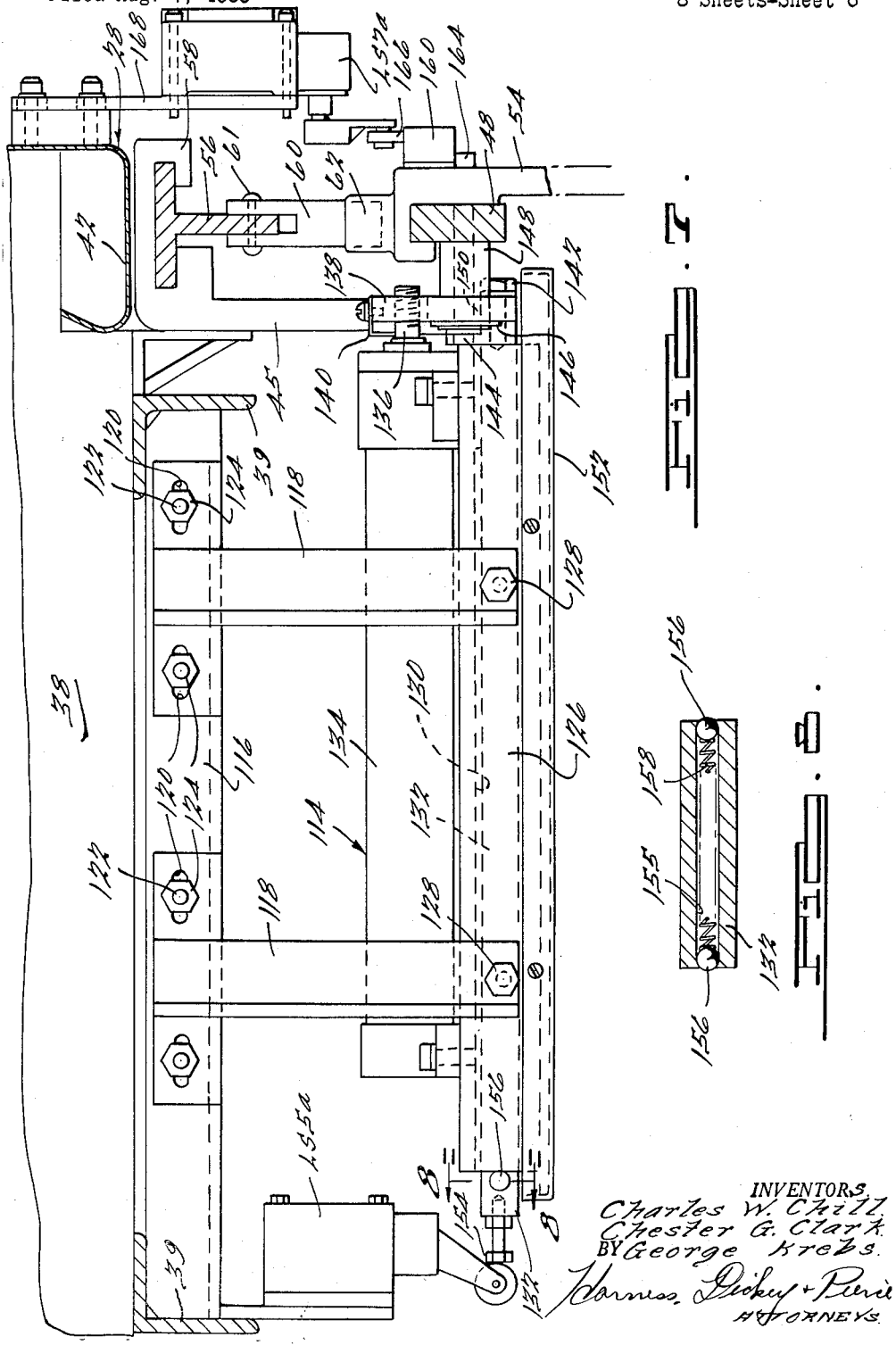

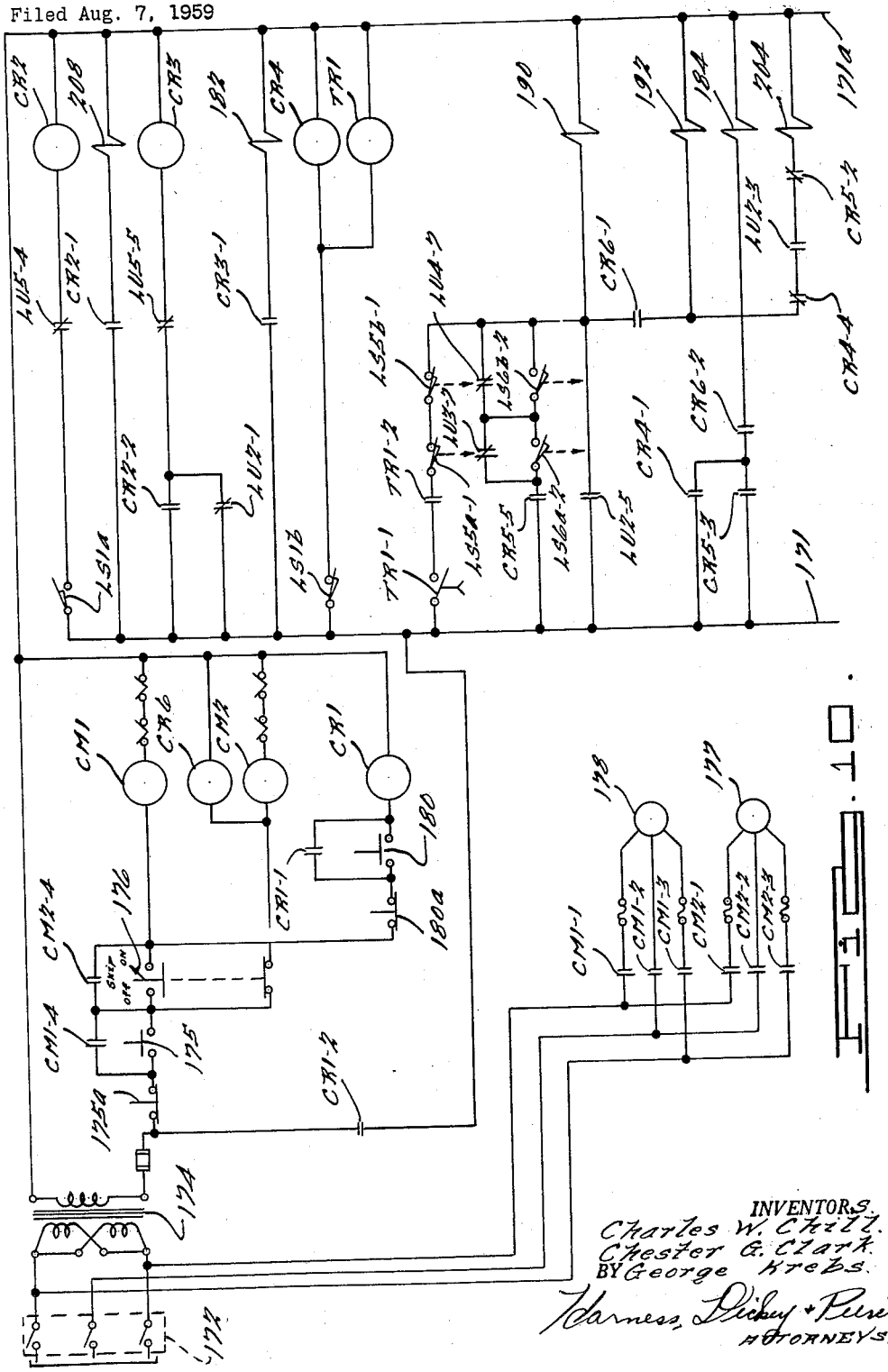

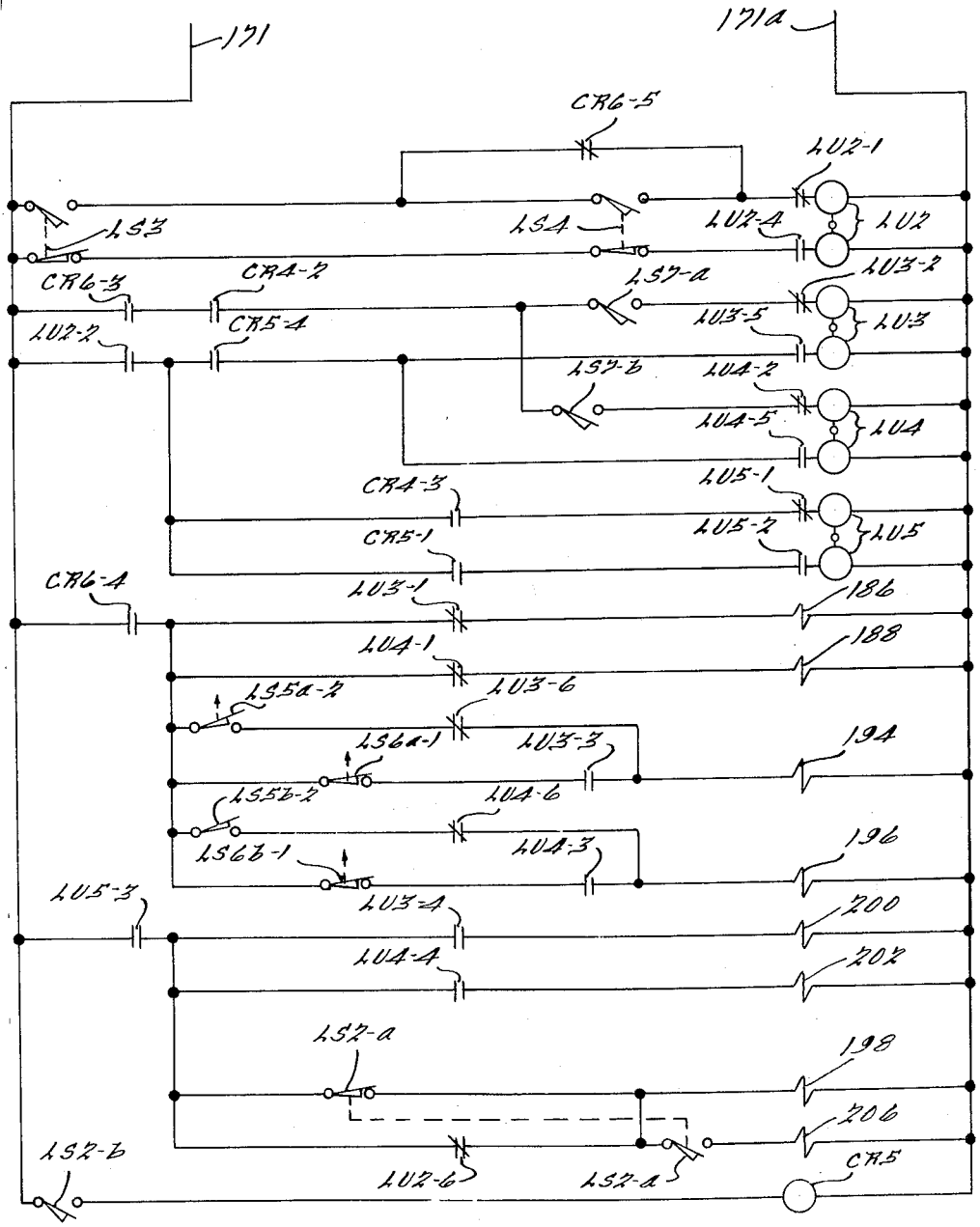

United States Patent Office 3,013,506
Patented Dec. 19, 1961

3,013,506
SKIP TRANSFER MECHANISM FOR
CONVEYING APPARATUS
Charles W. Chill, Milford, Chester G. Clark, Detroit, and George Krebs, East Detroit, Mich., assignors to The Udylite Corporation, Detroit, Mich., a corporation of Delaware
Filed Aug. 7, 1959, Ser. No. 832,363
8 Claims. (Cl. 104—162)

This invention pertains to improvements in work conveying apparatus of the general type disclosed in United States Patent Re. 24,072, issued October 11, 1955, originally 2,650,600, issued September 1, 1953, which is assigned to the same assignee of the present invention.

In conveying apparatus of the general character described in the aforementioned patent, a plurality of work carriers are movably mounted on a work supporting rail and conveyed therealong around a circuit usually having two straight side sections connected at one or both of their ends by an arcuate turn-around section. A reciprocating pusher-type transfer mechanism intermittently moves the work carriers along the supporting rail, and work pieces suspended therefrom are passed through a series of treating receptacles. The workpieces are periodically lifted in order that they may be transferred over the partitions separating adjoining treating receptacles. Lifting of the workpieces is achieved by an elevator chassis, mounted over the treating receptacles and movable in a vertical direction between a raised position and a lowered position. Sections of the workpiece supporting rail are secured to the chassis, whereby workpieces suspended therefrom are lifted and lowered as the chassis is raised and lowered.

The increasing emphasis on automated manufacturing methods, enabling high volume production of increasingly complex and varied products, has created a continuing need for production machinery that is flexible and readily adaptable to changes and variation in product design. In electroplating operations, for example, a conveying apparatus of the type herein described may be utilized to process a large number of different type articles through a variety of different treating sequences. This normally requires processing each type or group of articles separately and modifying the arrangement of treating receptacles and/or treating solutions to accommodate the next group of workpieces. In production runs of comparatively short duration, the time required to modify the machine and treating solutions between successive groups of articles frequently represents a substantial percentage of the total effective processing run and consequently materially impairs of efficient utilization of equipment and manpower. The present invention provides new and unique improvements, whereby the flexibility and processing efficiency of conveying apparatus is increased over that of similar type apparatus heretofore known.

The primary object of this invention is to provide improved conveying apparatus adapted to simultaneously process two or more different groups of articles which deviate slightly from one another in their treating steps and which apparatus automatically and selectively directs each of the articles through its appropriate treating sequence.

Another object of this invention is to provide improved conveying apparatus having at least one auxiliary or skip rail section to which successive work carriers may be selectively transferred, diverting them from the normal treating sequence through an alternate treating sequence.

Still another object of this invention is to provide an improved conveying apparatus having laterally movable rail sections of compact design and durable operation, operative and adapted to transfer work pieces from the normal treating sequence to an alternate treating sequence, and whereby the operation of the laterally movable rail sections can be simply integrated with the operating sequence of the principal conveying apparatus.

Other objects and advantages of the present invention will become apparent from the following detailed description taken in conjunction with the accompanying drawings, wherein:

FIG. 1 is a plan view of the conveying machine embodying this invention;

FIG. 2 is a side elevation view of the conveying machine shown in FIG. 1, and wherein the chassis is in the lowered position;

FIG. 3 is a transverse vertical sectional view of the conveying machine shown in FIG. 2 and taken along line 3—3 thereof;

FIG. 4 is a longitudinal elevation view of the skip rail section shown in FIG. 3, taken along line 4—4 thereof and looking in the direction of the arrows;

FIG. 5 is a transverse vertical sectional view through the skip rail section shown in FIG. 4 and taken along line 5—5 thereof;

FIG. 6 is an enlarged fragmentary elevation view of a portion of the elevator chassis and showing in particular the laterally movable rail section in relation to a work carrier suspended from the work supporting rail;

FIG. 7 is a transverse vertical sectional view of the elevator chassis shown in FIG. 6 and taken along the line 7—7 thereof;

FIG. 8 is a transverse vertical sectional view through the slide member locking device shown in FIG. 7 and taken along line 8—8 thereof;

FIG. 9 is a schematic perspective view, showing the relationship between the skip rail section, laterally movable rail sections, vertically movable rail sections and fixed rail sections; and FIGS. 10 and 11 are a schematic wiring diagram of the electrical control circuit for the conveying machine.

Referring now to the drawings and as may be best seen in FIGS. 1 to 3, a conveying machine, embodying this invention, is comprised of a central frame, including upright end columns 20 rigidly supported at their lower ends on longitudinal "I" beam 21, mounted on longitudinal partition 22, separating two parallel rows of partitioned treating recepacles 23. The bases of receptacles 23 are supported on a suitable base frame such as "I" beams 24. Longitudinal frame member 26 extends the entire length of the machine and is rigidly supported on the upper ends of end columns 20. An elevator chassis 28 is movably mounted on end columns 20 and is suspended from the central frame by means of cables 30 and 30a and having one end thereof rigidly secured to the elevator chassis 28. Cables 30 and 30a extend over sheaves 32 rotatably mounted on the central frame. The other ends of cables 30 and 30a are rigidly fastened to cross head 34 connected to the piston rod of double acting hydraulic lift cylinder 36 mounted at one end of longitudinal frame member 26. By this arrangement, the elevator chassis is raised and lowered as the cross head 34 is reciprocated through a forward and a return stroke by lift cylinder 36. As shown schematically in FIG. 3, chassis down signal limit switch LS1b and chassis down safety cushion limit switch LS1a are fixedly secured to the central frame and actuable by cams 35 mounted on the chassis. Similarly, chassis up signal limit switch LS2b and chassis up safety cushion limit switch LS2a are fixedly secured in an elevated position to the central frame. Actuation of safety cushion limit switches LS1a and LS2a, by cams 35, reduce the rate of descent and ascent, respectively, of the chassis as it approaches the fully lowered and fully raised positions, as will be subsequently described in detail in the discussion of the central control system. Adjustable mechanical stop means 37 are also affixed to the central frame and upon which the chassis rests in the fully down position. Elevator chassis 28 comprises a structural framework of transverse members 38, longitudinal angle members 39 and diagonal rigidifying members 40, which are enclosed in an outer steel sheet casing 42. An aligned series of spaced rail sections 44 are secured to the underside of the elevator chassis 28 by brackets 45 and are raised and lowered above the treating receptacles 23, as the chassis is raised and lowered. A series of spaced work supporting rail sections are fixedly mounted directly over the receptacles by transverse brackets 47 secured to the central frame and are adapted to align with the movable spaced rail sections 44 when the elevator chassis 28 is in the lowered position. Sections 48 and 48a of the movable rail section 44 are also adapted to be movable laterally in a substantially horizontal direction outwardly from said elevator chassis and in alignment with the ends of skip rail section 50, fixedly supported in an elevated position longitudinally of the movable rail section when said chassis is in the elevated position. It will, of course, be appreciated that the skip rail section is equally applicable to machines of the straight-through type as it is to the turn-around type conveying apparatus herein described.

Work pieces, such as panels 52 suspended from slidably mounted work hangers or carriers 54, are propelled along the vertically movable rail sections 44, fixed rail sections 46 and laterally movable rail sections 48 and 48a of the principal conveying machine by a reciprocating pusher mechanism mounted on the chassis of the principal conveying machine. The principal work transfer pusher mechanism is comprised of pusher bars 56 mounted for reciprocating movement along the straight side portions of the machine and above the work supporting rail section. The pusher bars 56 are of a T-shaped cross section and are slidably mounted in shoes 58, forming an integral part of bracket 45 rigidly affixed to the underside of the elevator chassis. A series of pushers 60 are pivotally mounted on pins 61, extending through the vertical flange of pusher bar 56, and are adapted to engage projections 62 at the upper portion of work carriers 54. The pushers 60 are constructed to pivot only on being retracted when they must travel across a work carrier and are maintained in the engaging position during the forward stroke of the pusher bar by suitable stop means incorporated therein. Pushers 60 are adjustable lengthwise on pusher bars 56 by positioning their pivot pins 61 in the appropriate apertures disposed along the pusher bar.

The pusher bars 56 are actuated from a double acting hydraulic transfer cylinder 64 mounted on the elevator chassis 28 adjacent to and longitudinally of pusher bar 56, as may be best seen in FIG. 1. Piston rod 65 of principal transfer cylinder 64 is connected to pusher arm 66 which is rotatably mounted on a vertical shaft 67 concentrically disposed in the arcuate turn-around section of the machine. The reciprocating stroke of piston rod 65 is transmitted to pusher arm 66, which, in turn, transmits the reciprocating motion of piston rod 65 to the pusher bars 56 disposed along each side of the machine by suitable link arms 68. The reciprocating stroke of transfer cylinder 64 is controlled by limit switch LS3 secured by suitable brackets to the elevator chassis and adapted to be tripped by actuators 70 mounted on the pusher bars 56. The direction of travel of the chassis pusher bar is controlled by a mechanically actuated slide valve (not shown) which when the chassis is in the raised or lowered position, is tripped by a cam (not shown) on the central frame, directing hydraulic fluid into the blank end of cylinder 64 preparatory to the forward stroke of the pusher mechanism. During travel of the chassis between the raised and lowered positions, the directional valve is off the cam and fluid is directed into the rod end of cylinder 64, causing the pusher transfer mechanism to return. Reference is made to Patent Re. 25,072 for a more detailed description of the transfer mechanism and other structural details of the machine embodying the present invention.

The skip rail 50 is fixedly supported longitudinally and outwardly of the elevator chassis 28, on a cantilever structural framework, comprising upright columns 72 rigidly affixed at their lower ends to angle brace member 74 secured to the outer partition 76 of the treating receptacles 23 and 23a, as may be best seen in FIGS. 2, 3 and 4. The outside partition 76 is reinforced by suitable angle braces 78 rigidly secured to the outer surface thereof by welding, bolting or the like. Secured to the upper ends of upright columns 72 and extending inwardly over the receptacles are horizontal cross members 80 reinforced by angular fillets 82. Vertical angle braces 84 are rigidly secured to the inner ends of cross members 80 and to the lower ends of which are secured brackets 45 of a similar design to those employed on the elevator chassis 28. Skip rail section 50 is rigidly secured to the lower ends of brackets 45, and pusher bar 86 is slidably mounted in shoe 58 at the upper end of bracket 45 in a manner similar to that employed for the principal transfer mechanism. A series of pivotally mounted pushers 88 and 88a are mounted at spaced intervals on pusher bar 86 directly above skip rail 50 and adapted to engage projections 62 of work carriers 54 slidably mounted on skip rail section. Longitudinal beam 90, a box-type construction, is rigidly attached to cross members 80 and is disposed directly above pusher bar 86. Transverse angle brackets 92 are rigidly affixed to the underside of longitudinal beam 90 and to which double acting hydraulic skip transfer cylinder 94 is securely bolted at each of its ends. Piston rod 96 of skip transfer cylinder 94 is connected at its end to upstanding bracket 98 rigidly secured to the upper surface of pusher bar 86. In this manner, the reciprocating travel of piston rod 96 is transmitted to pusher bar 86, whereby work carriers suspended on skip rail section 50 are intermittently transferred therealong by pushers 88 and 88a. A drip tray 100 is disposed below skip transfer cylinder 94 to catch any hydraulic fluid that may leak from the cylinder, thereby preventing contamination of the treating solution below. Actuation of skip transfer cylinder 94 is synchronized with principal transfer cylinder 64 mounted on the elevator chassis in accordance with a controlled operating sequence which will be subsequently described.

The reciprocating movement of pusher bar 86 is controlled by limit switch LS4 and actuators 102 adjustably mounted on pusher bar 86. As shown in FIG. 5, limit switch LS4 is secured to vertical bracket 104, having vertical slots 106 at the upper end thereof through which securing bolts 108 pass and thereby clamping bracket 104 to transverse bracket 110 secured to longitudinal beam 90. The provision of slots 106 enables vertical bracket 104 to be adjusted, whereby the roller 112 of limit switch LS4 can be aligned with actuator 102 on pusher bar 86.

As shown in FIG. 4, skip rail section 50 is of a length equal to the distance between the ends of laterally movable rail sections 48 and 48a, and which rail sections are adapted to fit contiguously to and in alignment with the ends of skip rail 50, when the elevator chassis is in the raised position, and said rail sections are in the projected position. In the specific embodiment of the invention herein described, laterally movable rail section 48 is employed to load or transfer work carriers 54 from vertically movable work supporting rail section 44 to skip rail section 50. Similarly, laterally movable rail section 48a is adapted to unload skip rail section 50 and transfer work carriers therefrom back to vertically movable rail sections 44 on the elevator chassis. By this arrangement, selective work pieces can be diverted from the normal treating sequence along the principal conveying machine to the skip rail section, thereby omitting a portion of the normal treating sequence. It will, of course, be appreciated by those skilled in the art that more than one skip rail section may be disposed at selected locations longitudinally of the elevator chassis, whereby selected work pieces may be diverted from two or more treating receptacles. Moreover, skip rail section 50 may also be adapted for vertical movement, whereby work pieces suspended therefrom may be alternately immersed in a treating receptacle disposed therebelow and adjacent to the treating receptacles below the principal work supporting rail. In either case, a pair of laterally movable rail sections, such as 48 and 48a, would be provided to transfer the work pieces between the principal work supporting rail and the auxiliary or skip rail section disposed longitudinally thereof.

Movement of the laterally movable rail sections 48 and 48a between a retracted position, wherein said rail sections are in alignment with vertically movable rail sections 44 of the principal conveying machine, and a projected position, wherein the laterally movable rail sections are in alignment with the ends of skip rail section 50, is achieved by hydraulic cylinder and slide assemblies 114 and 114a carried by the chassis. The hydraulic cylinder and slide assembly 114 and 114a, for laterally movable rail sections 48 and 48a, respectively, are identical in all respects, and, accordingly, only one such assembly need be described in detail. As shown in FIGS. 6 and 7, hydraulic cylinder and slide assembly 114 is mounted transversely of the chassis and adapted to reciprocate laterally movable rail section 48 substantially perpendicular to the principal work supporting rail section 44. U-shaped channel 116 is rigidly affixed at each of its ends to longitudinal angle braces 39, depending from the lower sides of the chassis. T-shaped brackets 118, having slots 120 along the upper ends thereof, are secured to the depending flanges of channel 116 by bolts 122 and nuts 124. Slide guide 126 is secured to the lower end of T-shaped bracket 118 by means of screws 128. Slide guide 126 has a rectangular aperture 130, disposed substantially in the center portion thereof, and extending longitudinally through the entire length of the guide. Slidably mounted within aperture 130 is rectangular slide 132. Mounted on the upper surface of slide guide 126 and disposed between T-shaped bracket 118 is double acting hydraulic lateral transfer cylinder 134, having its longitudinal axis disposed above and in alignment with the center line of slide 132. The forward end of piston rod 136 of hydraulic cylinder 134 is connected to cross head 138 by suitable connecting means such as threaded engagement of rod 136 with a corresponding threaded bore in said cross head 138. Spring clip 140, secured to the upper portion of cross head 138 and in contact with piston rod 136, prevents rotation of the piston rod relative to the cross head, locking the assemblies together. The lower portion of cross head 138 is rigidly affixed to slide 132 by means of screws 142. Laterally movable rail section 48 is mounted on and spaced outwardly from cross head 138 by means of screws 144, washer 146 and annular spacer 148 disposed between said cross head and said rail section. In treating sequences, wherein it is desired to electrify laterally movable rail section 48, such as, for example, in an electroplating operation, washer 146 and annular spacer 148 would be comprised of an insulating material. In addition, an annular sleeve 150, also of an insulating material, would be disposed between the washer and annular spacer to insulate bolt 144 from cross head 138. A drip tray 152 is secured at the lower portion of slide guide 126 and is adapted to catch any hydraulic fluid that may seep from cylinder 134.

Hydraulic cylinder and slide assembly 114 is shown in FIG. 7 in its fully retracted position, wherein laterally movable rail section 48 is in alignment with vertically movable rail section 44 carried by the elevator chassis. When hydraulic cylinder 134 is actuated, piston rod 136 moves cross head 138 and laterally movable rail section 48 outwardly, whereby a work carrier, suspended therefrom, is moved into alignment with skip rail section 50. In the retracted and extended positions, and during the travel therebetween, laterally movable rail section 48, cross head 138 and piston rod 136 are supported by the co-action of slide 132 and slide guide 126. Slide 132 is of sufficient length that when laterally movable rail section 48 is in the projected position, a sufficient length of slide 132 remains within slide guide 126 to provide adequate vertical support of rail section 48. The outward travel limit of laterally movable rail section 48 is defined by the maximum extended displacement of piston rod 136. Appropriate alignment of laterally movable rail section 48 with skip rail section 50, in the fully extended position, is achieved by slotted provisions 120 in T-brackets 118. Since laterally movable rail section 48 is in the extended position for only a short period of time, it is ordinarily not necessary to maintain a positive fluid pressure on hydraulic cylinder 134 to prevent drift of rail section 48 out of alignment with skip rail section 50, and hydraulic fluid to cylinder 134 is normally recirculated to the reservoirs as soon as rail 48 attains its fully projected position. The fully retracted position of laterally movable rail section 48 is controlled by adjustable actuator means 154, mounted on the rear portion of slide 132, and adapted to trip limit switch LS5a at the point when laterally movable rail section 48 is in alignment with vertically movable rail section 44 of the principal rail. Limit switch LS5a is connected to the central control system and is effective to stop the flow of hydraulic fluid into the rod end of hydraulic cylinder 134 by closing a solenoid valve and opening a bleed solenoid valve, whereby the hydraulic fluid is returned to the reservoir. Since laterally movable rail section 48 is normally in the retracted position internal leakage of hydraulic fluid around the piston of cylinder 134 may permit rail section 48 to drift out of alignment with vertically movable rail sections 44. In order to prevent drift of rail section 48, a suitable locking device is employed in slide 132, thereby preventing laterally movable rail section 48 from drifting out of alignment with adjoining rail sections. The locking device, as shown in section in FIG. 8, is comprised of a horizontal bore 155 through slide 132 in which spherical balls 156 are resiliently mounted between coil spring 158. The bore adjacent to the side surfaces of slide 132 are peened inwardly to prevent escape of balls 156 and permitting a portion thereof to extend beyond the side surface of slide 132. When slide 132 is in its fully retracted position, balls 156, projecting beyond the side surface of slide 132, engage the end surfaces of slide guide 126, preventing the outward movement of laterally movable rail section 48. When hydraulic cylinder 134 is actuated, the resiliency of spring 158 is overcome by the co-action between the projecting portions of balls 156 and slide guide 126, and balls 156 are forced inwardly flush with the sides of slide 132.

Actuation of hydraulic cylinder 134 may be automatically programmed into the operating sequence of the conveying machine or by suitable actuating means disposed on each work carrier 54. In the specific conveying apparatus shown in the drawings, a manually operative cam 160 is pivotally mounted on the outer surface of work carriers 54 by means of a pin 162 and is movable between an actuating position and a non-actuating position as may be best seen in FIG. 6. When in the actuating position, cam 160 is disposed in a horizontal position and supported on stop pin 164 mounted on the face of work carrier 54. In that position, the upper surface of cam 160 is adapted to trip roller 166 of limit switch LS7a disposed longitudinally of work supporting rail 44 and fixedly secured to vertical bracket 168 bolted to the side of elevator chassis 28. The non-actuating position of cam 160 and non-actuated position of roller 166 of limit switch LS7a is shown in phantom in FIG. 6. Movement of cam 160 to the appropriate position can be achieved at the time work pieces are loaded on the work carriers 54. If, for example, a specific work piece was to be skipped from a portion of the normal treating sequence, the operator at the loading station would position cam 160 in the actuating position, whereby limit switch LS7a would be tripped so as to cause that work carrier to be transferred to the skip rail 50 by laterally movable rail section 48. It will, of course, be appreciated, by those skilled in the art, that similar actuating means are applicable when two or more skip rail sections are employed in the conveying apparatus. Additional flexibility can be achieved when two or more skip rail or auxiliary rail sections are incorporated by employing a multiple position cam adapted to selectively trip one, two or more of the limit switches controlling each pair of laterally movable rail sections. By this arrangement, two auxiliary or skip rail sections would provide four alternate treating sequences for work pieces conveyed along the machine.

The hydraulic cylinder and slide assembly 114a, connected to laterally movable unload section 48a, is actuable in response to a work carrier tripping limit switch LS7b disposed adjacent to skip rail section 50. As may be best seen in FIG. 5, limit switch LS7b is mounted at the lower end of vertical bracket 104 and is actuated by a rearward extending portion of work carrier 54, as it moves longitudinally along skip rail section 50. When limit switch LS7b is tripped, the hydraulic cylinder and slide assembly 114a connected to laterally movable unload section 48a is actuated to cause rail section 48a to move outwardly and in alignment with skip rail section 50 to receive the work carrier transferred therealong. An added safety feature is provided by means of limit switches LS6a and LS6b, actuable by laterally movable rail sections 48 and 48a, respectively, when said rail sections are in the projected position, and the elevator chassis is in the raised position. Limit switches LS6a and LS6b, as shown in FIG. 4, are fixedly secured to brackets 170 and 170a, respectively, which are secured to the end vertical angle braces 84 of the skip rail section. Actuation of these limit switches, by the respective laterally movable rail sections, must first occur before the principal transfer mechanism and skip rail transfer mechanism can be actuated. Consequently, the actuation of skip transfer mechanism, effective to move a work carrier off laterally movable rail section 48 and onto skip rail section 50 and effective to move a work carrier off skip rail 50 onto laterally movable skip rail section 48a, is prevented unless the laterally movable rail sections are in alignment with skip rail 50. Limit switches LS6a and LS6b, when actuated, are also effective to open solenoid actuated bleed-off valves, whereby hydraulic fluid to lateral transfer cylinders is recirculated to the reservoir.

A typical flow of the work carriers along the principal work supporting rail, comprising vertically movable rail section 44, laterally movable rail sections 48 and 48a, and fixedly supported rail section 46 and in the direction of the arrows is shown diagrammatically in FIG. 9. An alternate flow of the work carriers is also shown in FIG. 9, wherein the work carriers are transferred from the principal work supporting rail 44 by the laterally movable load section 48 to the skip rail section 50 and then back to the principal work supporting rail by laterally movable unload rail section 48a. In the normal operating sequence, work carriers are transferred from vertically movable rail section 44 to the midpoint of laterally movable rail section 48, while the chassis is in the lowered position. The elevator chassis is then raised and the work carrier is transferred from laterally movable rail section 48 to vertically movable rail section 44 and over the intervening tank partition. The chassis is again lowered, whereby the work piece suspended from vertically movable rail section 44 is lowered into multiple station tank 23a (FIG. 1), and wherein vertically movable rail section is in alignment with fixed rail section 46. While the chassis is in the lowered position, the work carrier is transferred to fixed rail section 46, along which it is intermittently transferred each time the principal transfer mechanism is actuated when the chassis is in the lowered position. When the work carrier is transferred to vertically movable rail section 44, it is withdrawn from multiple station tank 23a, when the chassis is raised, and transferred in an elevated position to the midpoint of laterally movable rail section 48a. The work piece is again lowered into the next adjacent tank, when the chassis is lowered, and is subsequently transferred to vertically movable rail section 44, while the elevator chassis is in the lowered position. The aforementioned transfer sequence constitutes the normal treating sequence of the specific conveying machine herein described.

The alternate treating sequence provided by the skip rail section enables selected work carriers to be diverted from the normal treating sequence, whereby work pieces, suspended therefrom, skip the multiple station tank 23a. A work carrier having actuator cam 160 in the actuating position trips limit switch LS7a as it is transferred from vertically movable rail section 44 to the midpoint of laterally movable rail section 48, while the chassis is in the lowered position. As the elevator chassis is raised, laterally movable load rail section 48 is moved outwardly and in alignment with skip rail section 50. The skip pusher mechanism is actuated transferring the work carrier to the first position on skip rail section 50. The elevator chassis is then lowered and laterally movable rail section 48 is retracted to its normal position in alignment with vertically movable rail section 44 of the principal work-supporting rail. After a predetermined dwell period in the down position, the principal pusher mechanism of the conveying and the skip pusher mechanism is actuated, whereby the work carrier on skip rail section 50 is transferred to the next position on skip rail 50. It will be noted that the principal pusher mechanism and skip pusher mechanism are actuated simultaneously every time the chassis reaches the raised position and the lowered position. Because, the principal pusher mechanism is effective to transfer the work carriers on fixed rail section 46, only when the chassis is in the lowered position, the skip transfer pusher mechanism is provided with short stroke pushers 88a (FIG. 4) to compensate for the two additional transfer strokes received by the work carrier on the skip rail section and whereby the work carrier is transferred back to the principal work supporting rail in the same ordered sequence as it had been in prior to transfer to the skip rail section. Variations in the specific spacing of the pushers 88 and 88a, mounted on the skip pusher bar 86, are, of course, feasible and are dependent on the number of treating stations that are to be skipped. While the chassis is in the lowered position, and during the last short stroke of the skip pusher mechanism, the selected work carrier trips limit switch LS7b, activating the hydraulic cylinder connected to laterally movable unload rail section 48a. As the elevator chassis is raised, laterally movable rail section 48a moves outwardly and in alignment with the end of skip rail section 50. With the elevator chassis in the raised position the skip pusher transfer mechanism transfers the selected work carrier to the midpoint of laterally movable rail section 48a from the last position on skip rail 50. The elevator chassis is then lowered, and, during its descent, laterally movable rail section 48a is withdrawn to the retracted position, wherein it is in alignment with vertically movable rail section 44 of the principal work supporting rail.

The foregoing operating sequence of the principal conveying machine and skip rail section is automatically coordinated by a central control system diagrammatically shown in FIGURES 10 and 11 which are joined together by conductors 171—171 and conductors 171a—171a, respectively. Let it be assumed that the elevator chassis is in the lowered position, and the chassis transfer pusher bar 56 is fully retracted and the chassis down signal limit switch LS1b is operated, and the mechanically operated chassis transfer directional valve is on the lower cam. Moreover, let it be assumed that laterally movable rail sections 48 and 48a and skip transfer pusher bar 86 are in their fully returned positions, and return signal limit switches LS5a and LS5b are actuated. The circuit is energized by closing main disconnect switch 172 which energizes voltage control transformer 174. With skip control selector switch 176 in the "on" position, start push-button 175 is depressed, whereby skip control relay CR6 is energized, closing normally open contacts CR6-1 through CR6-4 and opening normally closed contact CR6-5. Simultaneously, skip section electric pump motor control relay CM2 is energized, closing motor contacts CM2-1 through CM2-3, thereby energizing electric motor 177. In addition contacts CM2-4 are closed, which energizes conveying machine electric hydraulic motor control relay CM1, which closes its contacts CM1-1 through CM1-3, and thereby energizing electric hydraulic pump motor 178. Holding contacts CM1-4 are also closed by relay CM1, whereby start button 175 may be released, keeping the circuit energized. In order to de-energize the circuit stop button 175a must be depressed. The machine control circuit is energized by depressing start button 180, which energizes machine control relay CR1, closing contacts CR1-1, which maintains control relay CR1 energized and allows start button 180 to be released. In order to de-energize the control circuit, stop button 180a must be depressed. Machine control relay CR1 also closes normally open contact CR1-2, thereby energizing the entire machine control circuit.

When the control circuit is energized, through contact CR1-2, chassis down cushion control relay CR3 is energized through contacts LU2-1 and LU5-5, whereby contacts CR3-1 are closed, energizing chassis down cushion solenoid valve 182. Down repeater control relay CR4 and down dwell timer TR1 are energized through chassis down signal limit switch LS1b. The skip transfer forward solenoid valve 184 is energized through control relay contacts CR4-1 and CR6-2. Skip load rail section 48 return solenoid valve 186 is energized through contacts CR6-4 and LU3-1. Skip unload rail section 48a return solenoid valve 188 is energized through contacts CR6-4 and LU4-1.

At the expiration of a preset time period, down dwell timer TR1 times out closing its contacts TR1-1 and TR1-2, whereby chassis transfer vent solenoid valve 190 is energized through contacts LS5a-1 and LS5b-1, and skip transfer vent solenoid valve 192 is energized through contacts LS5a-1, LS5b-1 and CR6-1. Accordingly, hydraulic fluid is permitted to flow into the blank ends of chassis transfer cylinder 64 and skip transfer cylinder 94 and the chassis and skip transfer pusher bars begin their forward stroke. During the forward stroke of the principal transfer pusher 56 skip section load signal limit switch LS7a is actuated and released by cam 160 on a work carrier, moving along rail section 44, indicating that the work pieces suspended therefrom are to be transferred to the skip rail section 50, thereby skipping the treating sequence of tank 23a. In addition, skip section unload signal limit switch LS7b is actuated and released by a work carrier, moving along skip rail section 50, indicating that the work pieces suspended therefrom are to be returned to the principal work supporting rail of the conveying machine, after having skipped the treating sequence of tank 23a. Actuation of limit switch LS7a energizes laterally movable load rail section 48, latch relay LU3 through contacts CR6-3 and CR4-2 and normally closed contact LU3-2 opening contacts LU3-1, thereby de-energizing load rail section returned solenoid valve 186. Actuation of limit switch LS7b energizes unload rail section 48a latch relay LU4 through contacts CR6-3, CR4-2 and normally closed contact LU4-2. Energization of latch relay LU4 opens normally closed contact LU4-1 and de-energizes unload rail section return solenoid valve 188. In addition, closing of normally open contacts LU3-3 of latch relay LU3 energizes load rail section bleed off solenoid valve 194 through contacts CR6-4 and LS6a-1. The closing of latch relay LU4 contact LU4-3 similarly energizes unload rail section bleed off solenoid valve 196 through contacts CR6-4 and LS6b-1.

At the end of the forward stroke of the chassis and skip transfer pusher bars, chassis transfer signal limit switch LS3 and skip transfer limit switch LS4 are operated by actuators 70 and 102, respectively, and thereby latching transfer repeater latch relay LU2 through normally closed contacts LU2-1. Contact LU2-5 of latch relay LU2 maintains the chassis and skip transfer vent solenoid valves 190 and 192 energized for the return of the chassis and skip transfer pusher bars during the up travel of the elevator chassis. Latch relay LU2 de-energizes down cushion control relay CR3 by opening normally closed contacts LU2-1 and which, in turn, opens its contacts CR3-1, thereby de-energizing chassis down cushion solenoid valve 182. At the same time latch relay LU2 closes contact LU2-2, energizing chassis lift signal latch relay LU5 through contacts CR4-3 and normally closed contact LU5-1. Latch relay LU5 closes contact LU5-3 energizing chassis lift vent solenoid valve 198 through chassis up safety limit switch contact LS2a. In addition, closing of normally open contacts LU5-3 energizes skip load section forward solenoid valve 200 through contacts LU3-4 and skip unload section forward solenoid 202 through LU4-4 contacts. Accordingly, hydraulic fluid is permitted to flow into the blank ends of chassis lift cylinder 36 and skip load section and skip unload section hydraulic cylinders, whereby the chassis commences to rise, and the laterally movable rail sections 48 and 48a start to move outwardly from the retracted position.

As the elevator chassis rises, chassis down signal limit switch LS1b and chassis down safety limit switch LS1a are released to their normal positions. The opening of contact LS1b de-energizes down repeater control relay CR4 and down dwell timer TR1. When control relay CR4 is de-energized, contact CR4-1 is opened, de-energizing skip transfer forward solenoid valve 184. Simultaneously, contacts CR4-4 are closed, energizing skip transfer solenoid valve 204 through contacts LU2-3, CR6-1, CR5-2, and hydraulic fluid now flows into the rod end of the skip transfer cylinder 94, and the skip transfer pusher bar 86 begins its return stroke. At the same time, the skip load section and skip unload section move forward, releasing return signal limit switches LS5a and LS5b, respectively. As the chassis rises, the mechanically operated chassis transfer directional valve (not shown) moves off the lower cam, and the flow of oil to chassis transfer cylinder 64 is reversed and oil is directed into the rod end of the cylinder, causing the pusher bar 56 to begin its return stroke. At the end of the return stroke of the chassis the skip transfer pusher bars chassis transfer limit switch LS3 and skip transfer limit switch LS4 are actuated and returned to their normal positions, closing their contacts and unlatching transfer repeater latch relay LU2 through contacts LU2-4. When latch relay LU2 is unlatched, contacts LU2-5 are opened, de-energizing chassis transfer vent solenoid valve 190, skip transfer vent solenoid valve 192, and skip transfer return solenoid valve 204.

As the chassis approaches the raised position, chassis up safety limit switch LS2a is actuated, energizing chassis up cushion solenoid valve 206 through contacts LU5-3 and normally closed contact LU2-6, whereby a portion of the hydraulic fluid flowing to chassis lift cylinder 36 is recirculated to the hydraulic reservoir and the speed of travel of the chassis is reduced. The elevator chassis continues to rise the remainder of the distance at a lower speed. Finally, when the chassis skip load section and skip unload sections 48 and 48a reach the fully raised position, chassis up signal limit switch LS2b, skip load section forward limit switch LS6a and skip unload section forward signal limit switch LS6b are actuated, and the mechanically operated chassis transfer directional valve is positioned on the upper cam. Actuation of limit switch LS2b closes its contacts, energizing up repeater control relay CR5. Actuation of limit switch LS6a opens contacts LS6a–1, de-energizing skip load section bleed off solenoid valve 194 and contacts LS6b–1 de-energize skip unload section bleed off solenoid valve 196, whereby hydraulic fluid directed to the load and unload transfer cylinders is recirculated to the hydraulic reservoir. When up repeater control relay CR5 is energized, contacts CR5–5 are closed, whereby chassis transfer vent solenoid valve 190 is energized through skip load section forward signal limit switch contacts LS6a–2, and skip unload section forward signal limit switch contacts LS6b–2. In addition, skip transfer vent solenoid valve 192 is energized through contacts LS6a–2, LS6b–2 and CR6–1. Up repeater control relay CR5 simultaneously closes contact CR5–3, energizing skip transfer forward solenoid valve 184 through contacts CR6–2. Accordingly, hydraulic fluid is directed into the blank ends of the chassis and skip transfer cylinders and pusher bars 56 and 86 begin their forward stroke. During the forward stroke of the pusher bar 86, a work carrier, suspended from laterally movable rail section 48, is transferred therefrom to skip rail section 50, and a work carrier, suspended from skip rail section 50, is transferred to laterally movable unload section 48a. At the end of the forward stroke of the chassis and skip transfer pusher bars, chassis transfer limit switch LS3 and skip transfer limit switch LS4 are again operated by actuators 70 and 102, respectively, and transfer repeater latch relay LU2 is latched through normally closed contact LU2–1. The latching of transfer repeater relay LU2 maintains the chassis transfer vent solenoid valve 190 and skip transfer vent solenoid valve 192 energized for the return of the chassis and skip transfer pusher bars during the down travel of the elevator chassis. Normally closed contacts LU2–6 are opened, de-energizing chassis lift vent solenoid valve 198 and normally open contacts LU2–2 are closed, unlatching skip load section latch relay LU3 through contacts CR5–4 and LU3–5. Simultaneously, skip unload section relay LU4 is unlatched through contacts CR5–4 and LU4–5. Normally closed contacts LU3–6 energize skip load section bleed off solenoid valve 194 through contacts CR6–4 and LS5a–2. Normally closed contact LU3–1 energizes skip load section return solenoid valve 186 through contacts CR6–4. Normally closed contacts LU4–6 energize skip unload section bleed off solenoid valve 196 through contacts CR6–4 and LS5b–2. Normally closed contacts LU4–1 energize skip unload section return solenoid valve 188 through contact CR6–4. Transfer repeater latch relay LU2 closes contacts LU2–2, unlatching chassis lift signal latch relay LU5 through contacts CR5–1 and LU5–2. The flow of hydraulic fluid to the skip load section and skip unload section hydraulic cylinders is reversed and directed into the rod ends, whereby laterally movable rail sections 48 and 48a start their return movement. Unlatching of chassis lift signal latch relay LU5 closes normally closed contacts LU5–4, which energizes chassis down control relay CR2 through chassis down safety limit switch LS1a and which, in turn, closes contact CR2–1, energizing chassis down solenoid valve 208. Simultaneously, contacts CR2–2 are closed, energizing chassis down cushion control relay CR3, which closes contacts CR3–1, energizing chassis down cushion solenoid valve 182. Accordingly, oil is permitted to flow out of the blank end of chassis lift cylinder 36, whereby the elevator chassis begins to descend. As the chassis descends, chassis up signal limit switch LS2b and chassis up safety limit switch LS2a are released to their normal positions. Opening of contacts LS2b de-energizes up repeater control relay CR5 which, in turn, opens its contact CR5–3, de-energizing skip transfer forward solenoid valve 184. Simultaneously, normally closed contact CR5–2 closes energizing skip transfer return solenoid valve 204 through contacts LU2–3, CR6–1, CR4–4 and LU2–5. The flow of hydraulic fluid to the skip transfer cylinder 94 is reversed and directed into the rod end thereof, whereby the pusher bar 86 begins its return stroke. At the same time, the mechanically operated chassis transfer directional valve moves off the upper cam and the flow of hydraulic fluid is directed into the rod end of the chassis transfer cylinder 64 and chassis transfer pusher bar 56 begins its return stroke. At the end of the return stroke of the chassis and skip transfer pusher bars, chassis transfer signal limit switch LS3 and skip transfer limit switch LS4 are actuated and returned to their normal positions, unlatching transfer repeater latch relay LU2 through contact LU2–4. Latch relay LU2 opens contact LU2–5, which de-energizes chassis transfer vent solenoid valve 190, skip transfer vent solenoid valve 192, and skip transfer return solenoid valve 204. During the downward travel of the elevator chassis, the skip load section and skip unload sections are fully returned, operating return signal limit switches LS5a and LS5b, respectively. Contacts LS5a–2 open de-energizing skip load section bleed off solenoid valve 194. Opening of contacts LS5b–2 de-energizes skip unload section bleed off solenoid 196, whereby hydraulic fluid to the hydraulic cylinders of the laterally movable rail sections is recirculated to the hydraulic reservoir. As the chassis approaches the lowered position, chassis down safety limit switch LS1a is operated, opening contacts LS1a and de-energizing chassis down control relay CR2, which opens contacts CR2–1 and de-energizes chassis down solenoid valve 208. De-energization of chassis down solenoid valve 208 closes the valve, thereby decreasing the amount of hydraulic fluid flowing out of the blank end of chassis lift cylinder 36, whereby the rate of descent of the chassis is reduced. When the chassis reaches the fully lowered position, chassis down signal limit switch LS1b is operated and the mechanically operated chassis transfer directional valve is on the lowered cam, and the machine is in position, preparatory to commencing another cycle as heretofore described.

By moving skip control selector switch 176 to the "off" position, the controls, applicable to the skip operation, are de-energized through opening contacts CR6–1 through CR6–4, and the conveying machine operates only in the normal sequence. Accordingly, actuation of load limit switch LS7a by a cam 160 in the actuating position on a work carrier will be ineffective to cause laterally movable load rail section 48 to move said work carrier to skip rail section 50. Accordingly, all work carriers will be conveyed through the normal treating sequence of the principal conveying machine.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A conveying apparatus comprising a frame, a series of supporting rail sections mounted on said frame and alignable in end to end relationship, an auxiliary rail section spaced laterally from said supporting rail sections, said supporting rail sections having two sections thereof laterally movable out of alignment therewith and into alignment with said auxiliary rail section, means associated with said laterally movable rail sections to selectively cause said sections to move into and out of alignment with said auxiliary and said supporting rail sections responsive to the movement of work carriers along said supporting rail sections and said auxiliary rail section, a first pusher means associated with said supporting rail sections and a second pusher means associated with said auxiliary rail section, said pusher means adapted to engage and advance work carriers along the several rail sections in the same direction.

2. A conveying apparatus comprising a frame, a longitudinally aligned series of vertically movable rail sections mounted on said frame, an auxiliary rail section spaced laterally from and longitudinally of said vertically movable rail sections, said vertically movable rail sections having two longitudinally spaced sections thereof laterally movable out of alignment therewith and into alignment with said auxiliary rail section, means associated with said laterally movable rail sections to selectively cause said sections to independently move into and out of alignment with said vertically movable and said auxiliary rail sections responsive to the movement of work carriers along said vertically movable and said auxiliary rail sections, a first pusher means associated with said vertically movable rail sections adapted to engage and advance work carriers along said vertically movable and laterally movable rail sections, and a second pusher means associated with said auxiliary rail section and adapted to advance work carriers along said auxiliary rail section and along said laterally movable rail sections when in alignment therewith.

3. A conveying apparatus comprising a frame, a longitudinally aligned series of vertically movable rail sections movably mounted on said frame, an auxiliary rail section disposed substantially parallel to and outwardly from said vertically movable rail sections, said vertically movable rail sections having two longitudinally spaced sections thereof laterally movable out of alignment therewith and into alngnment with said auxiliary rail section, a plurality of work carriers movably mounted on said several rail sections, means associated with each of said laterally movable rail sections to selectively cause said sections to independently move into and out of alignment with said vertically movable and said auxiliary rail sections responsive to the movement of work carriers along said vertically movable and said auxiliary rail sections, a first pusher means associated with said vertically movable rail sections adapted to engage and advance said work carriers along said vertically movable and said laterally movable rail sections, a second pusher means associated with said auxiliary rail section and adapted to advance said work carriers along said auxiliary rail section and along said laterally movable rail sections when in alignment therewith, and control means for coordinating the operating sequence of said conveying apparatus.

4. A conveying apparatus comprising a frame, an elevator chassis movably mounted on said frame, a longitudinally aligned series of vertically movable rail sections carried by said chassis and including a laterally movable load rail section and a laterally movable unload rail section longitudinally spaced from said load rail section, an auxiliary rail section fixedly supported outwardly of and substantially parallel to said vertically movable rail sections and having a load end and a unload end, said laterally movable load and unload rail sections independently movable between a retracted position in alignment with said vertically movable rail sections and a projected position contiguous to and in alignment with said ends of said auxiliary raily section, a plurality of work carriers movably mounted on said several rail sections, a first pusher means carried by said chassis and adapted to engage and advance said work carriers along said vertically movable rail sections and along said laterally movable rail sections when in said retracted position, a second pusher means mounted longitudinally of said auxiliary rail section and adapted to engage and advance work carriers along said auxiliary rail section and along said laterally movable rail sections when in said projected position, means disposed adjacent to said laterally movable load rail section cooperating with presettable means on said work carriers to selectively cause said load rail section to move outwardly into said projected position and in alignment with said load end of said auxiliary rail section, and means disposed longitudinally of said auxiliary rail section actuable in response to movement of a work carrier therealong to cause said laterally movable unload rail section to move outwardly into the projected position and in alignment with said unload end of said auxiliary rail section.

5. A conveying apparatus comprising a frame, an elevator chassis mounted on said frame and movable between a raised position and a lowered position, a longitudinally aligned series of vertically movable rail sections carried by said chassis and including a laterally movable load rail section and a laterally movable unload rail section longitudinally spaced from said load rail section, a skip rail section fixedly supported in an elevated position and disposed outwardly of and substantially parallel to said vertically movable rail sections, said skip rail section having a load end and unload end, moving means asssociated with said laterally movable load and unload rail sections and adapted to independently move said rail sections between a retracted position in alignment with said vertically movable rail sections and a projected position contiguous to and in alignment with said ends of said skip rail section when said chassis is in the elevated position, a plurality of work carriers movably mounted on said several rail sections, a first pusher means carried by said chassis and adapted to engage and advance said work carriers along said vertically movable rail sections and along said laterally movable rail sections when in said retracted position, a second pusher means mounted longitudinally of said skip rail section and adapted to engage and advance work carriers along said skip rail section and along said laterally movable rail sections when in said projected position, means disposed adjacent to said laterally movable load rail section cooperating with presettable means on said work carriers to selectively actuate said moving means to cause said load rail section to move outwardly into said projected position and in alignment with said load end of said skip rail section, means disposed longitudinally of said skip rail section actuable in response to movement of a work carrier therealong to cause said moving means to move said laterally movable unload rail section outwardly into the projected position and in alignment with said unload end of said skip rail section, and control means for coordinating the operating sequence of said conveying apparatus.

6. A conveying apparatus for successively conveying a plurality of work pieces through a series of treating stations comprising rail means for concurrently supporting a plurality of said work pieces over said treating stations, propelling means for successively advancing said work pieces along said rail means, auxiliary rail means along a portion of said treating stations to which selected ones of said work pieces are transferred, means for transferring selected ones of said work pieces to said auxiliary rail means, propelling means for advancing said work pieces along said auxiliary rail means in the same direction as said work pieces are advanced along said rail means, and means for returning said work pieces from said auxiliary rail means to said rail means over said treating stations in the same original sequence of said work pieces.

7. A conveying apparatus for successively conveying work pieces through an aligned series of treating stations comprising rail means for concurrently supporting a plurality of work carriers having work pieces suspended therefrom over said treating stations, elevating means movable to and from a raised position and a lowered position for sequentially raising and lowering portions of said rail means and work carriers thereon over said treating stations, propelling means for successively advancing said work carriers along said rail means, auxiliary rail means along a portion of said treating stations to which selected ones of said work carriers are transferred, means for transferring selected ones of said work carrierss from alignment with said rail means into alignment with said auxiliary rail means during the vertical movement of said elevating means, propelling means for advancing said selected work carriers along said auxiliary rail means in the same direction as said work carriers are advanced along said rail means, means for returning said selected work carriers from alignment with said auxiliary rail means into alignment with said rail means over said treating stations during the vertical movement of said elevating means in the same original sequence of said work carriers, and control means for coordinating the operating sequence of the conveying apparatus.

8. A conveying apparatus for successively conveying work pieces through an aligned series of treating stations comprising rail means for concurrently supporting a plurality of work carriers having work pieces suspended therefrom over said treating stations, elevating means movable to and from a raised position and a lowered position for raising and lowering a portion of said rail means and work carriers thereon in a predetermined sequence over said treating stations, propelling means for intermittently advancing said work carriers along said rail means, auxiliary rail means disposed in an elevated position along a portion of said treating stations to which selected ones of said work carriers are transferred, means for transferring selected ones of said work carriers from alignment with said rail means into alignment with said auxiliary rail means during the ascent of said elevating means, propelling means for intermittently advancing said selected work carriers along said auxiliary rail means, means for returning said selected work carriers from alignment with said auxiliary rail means into alignment with said rail means over said treating stations during the descent of said elevating means in the same original sequence of said work carriers, and control means for coordinating the operating sequence of the conveying apparatus.

References Cited in the file of this patent

UNITED STATES PATENTS

| | | |
|---|---|---|
| 1,819,017 | Drake | Aug. 18, 1931 |
| 2,572,011 | Cohen et al. | Oct. 23, 1951 |
| 2,782,727 | King | Feb. 26, 1957 |
| 2,845,034 | Harrison | July 29, 1958 |
| 2,868,138 | Bishop et al. | Jan. 13, 1959 |
| 2,875,704 | Yates | Mar. 3, 1959 |
| 2,885,969 | Kay et al. | May 12, 1959 |